United States Patent [19]

Tojo et al.

[11] Patent Number: 4,995,111
[45] Date of Patent: Feb. 19, 1991

[54] RING TRIP CIRCUIT FOR SUBSCRIBER TELEPHONE

[75] Inventors: Toshiro Tojo; Kenji Takato; Kazumi Kinoshita; Yuzo Yamamoto, all of Kawasaki; Yozo Iketani, Yokohama; Shin-ichi Ito, Tokyo, all of Japan

[73] Assignee: Fujitsu Limited, Kawasaki, Japan

[21] Appl. No.: 320,297

[22] PCT Filed: Jun. 18, 1988

[86] PCT No.: PCT/JP88/00607
§ 371 Date: Feb. 21, 1989
§ 102(e) Date: Feb. 21, 1989

[87] PCT Pub. No.: WO88/10542
PCT Pub. Date: Dec. 29, 1988

[30] Foreign Application Priority Data

Jun. 19, 1987 [JP] Japan ............... 62-152636
Dec. 24, 1987 [JP] Japan ............... 62-325330

[51] Int. Cl.⁵ ............................................. H04M 3/02
[52] U.S. Cl. ................................... 379/382; 379/405; 379/373; 379/251
[58] Field of Search ............... 379/382, 377, 405, 413, 379/418, 373, 372, 251, 252, 253, 254, 255

[56] References Cited

U.S. PATENT DOCUMENTS

| | | | |
|---|---|---|---|
| 3,941,939 | 3/1976 | Holmes et al. | 379/252 |
| 4,356,355 | 10/1982 | Ferrieu et al. | 379/382 |
| 4,447,675 | 5/1984 | Arntsen et al. | 379/65 |
| 4,827,505 | 5/1989 | Takato et al. | 379/413 |

Primary Examiner—James L. Dwyer
Assistant Examiner—M. Shehata
Attorney, Agent, or Firm—Staas & Halsey

[57] ABSTRACT

An improved ring trip circuit for a subscriber telephone, for detecting an on-hook state or an off-hook state of the telephone. The ring trip circuit can be formed in a small size and can be formed by a LSI. The ring trip circuit includes a voltage detecting circuit (2), for detecting a voltage difference (ΔV) between both ends of a ringer sending resistor, having a first circuit (S1, S2, A1~B3) converting the voltage difference to a current difference, and further having a second circuit (F) converting the current difference to a voltage, the voltage difference varying in response to the on-hook state or the off-hook state of the telephone, and a state detecting circuit (3) for detecting the on-hook state or the off-hook state in response to a value of the voltage from the voltage detecting circuit. The voltage detecting circuit is formed by a plurality of current mirror circuits, each of which includes at least two transistors. The state detecting circuit includes a comparator circuit (CP1) formed by a plurality of transistors.

31 Claims, 13 Drawing Sheets

Fig.3a
Fig.3b
Fig.4a
GND ─────────
-48V ─∿∿─
Fig.4b
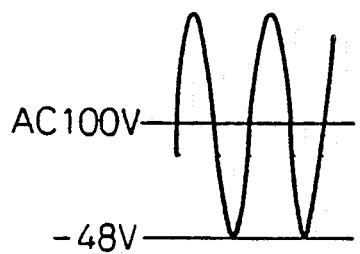

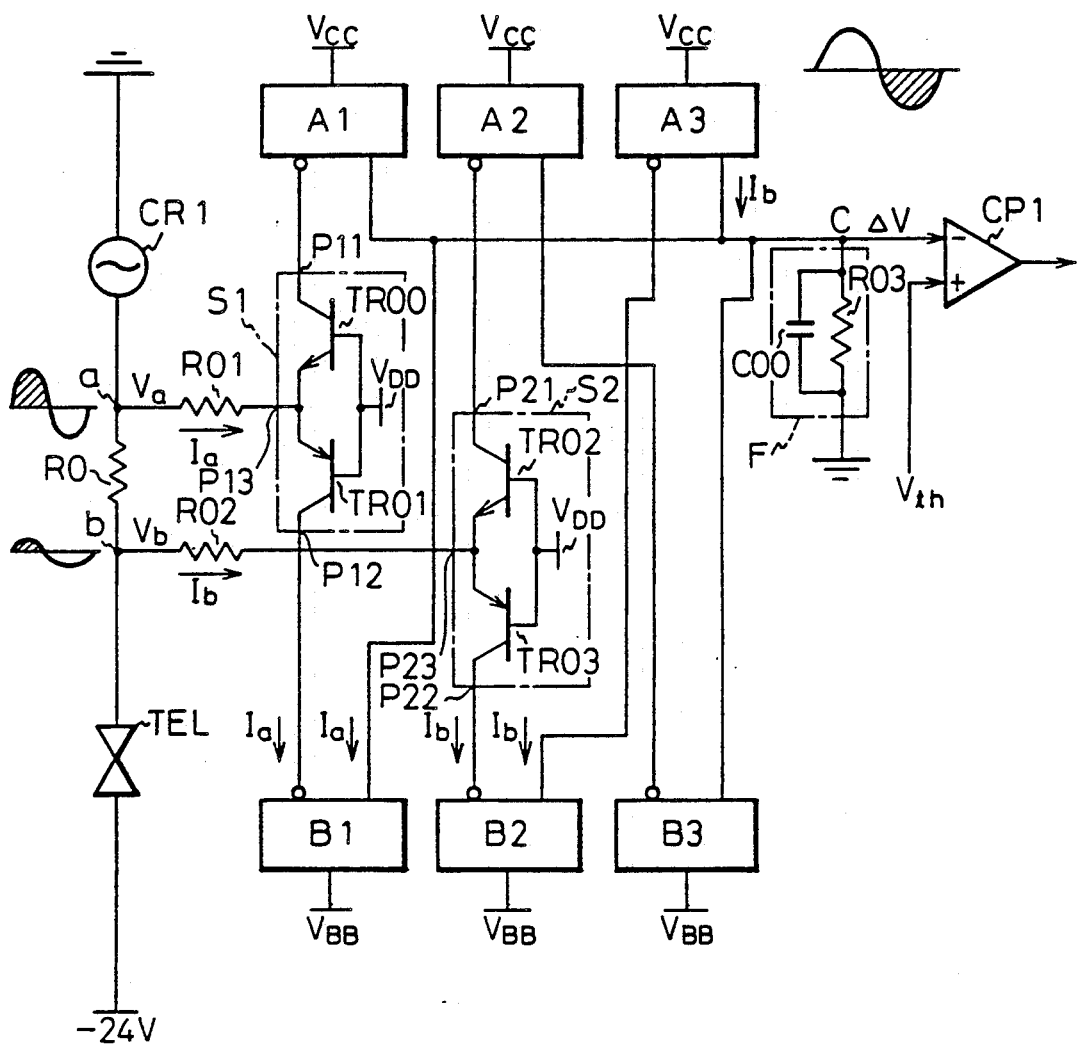

REFERENCE

| | | |
|---|---|---|
| A1 ~ A3 | ..... | CURRENT MIRROR CIRCUIT |
| B1 ~ B3 | ..... | CURRENT MIRROR CIRCUIT |
| S1, S2 | ..... | CURRENT SWITCHING CIRCUIT |
| TEL | ..... | TELEPHONE |
| CR | ..... | RINGER SOURCE |
| D | ..... | VOLTAGE LIMITER |
| F | ..... | FILTER |
| SI | ..... | CURRENT SOURCE CIRCUIT |
| SV | ..... | THRESHOLD VOLTAGE SUPPLYING CIRCUIT |
| 7 | ..... | CURRENT DIFFERENCE DETECTING CIRCUIT |
| 8 | ..... | ABSOLUTE CALCULATION CIRCUIT |
| 9 | ..... | VOLTAGE CONVERSION CIRCUIT |
| 71 | ..... | CURRENT INVERSION CIRCUIT |
| 72 | ..... | ADDITION CIRCUIT |

RING TRIP CIRCUIT FOR SUBSCRIBER TELEPHONE

BACKGROUND OF THE INVENTION a. Field of the Invention

The present invention relates to a ring trip circuit for a subscriber telephone, by which an on-hook state or an off-hook state of the telephone is detected. More particularly, it relates to an improved ring trip circuit which has a reduced size and can be formed by a large scale integrated circuit.

b. Description of the Related Art

Ring trip circuits are provided in a telephone exchanger (or switching board) for detecting an on-hook state or off-hook state of subscriber telephones. Each ring trip circuit is connected to a subscriber line, i.e., a ring trip circuit must be provided for each subscriber telephone. Since the telephone exchanger processes a large number of subscriber lines, for example, over 20,000 subscriber lines, a large number of ring trip circuits are provided in the telephone exchanger.

The ring trip circuit of the prior art are bulky and are not suitable to be formed by a large scale integrated circuit (LSI). Also, the ring trip circuits of the prior art are expensive.

The prior art ring trip circuit will be described in more detail later with reference to the drawings.

SUMMARY OF THE INVENTION

An object of the present invention is to provide a ring trip circuit which can be formed in a small size and by a large scale integrated circuit.

Another object of the present invention is to provide a ring trip circuit which can be manufactured at a low cost.

According to a basic aspect of the present invention, there is provided a ring trip circuit for a subscriber telephone, including: a voltage detecting circuit, operatively connected between both ends of a ringer sending resistor operatively connected between the subscriber telephone and a ringer source, for detecting a voltage difference between both ends of the ringer sending resistor, and having a circuit converting the voltage difference to a current difference the voltage difference varying in response to whether the subscriber telephone, in an on-hook state or an off-hook state; and a state detecting circuit, operatively connected to the voltage detecting circuit, for detecting the on-hook state or the off-hook state of the subscriber telephone in response to a value corresponding to the voltage difference. The voltage detecting circuit is formed by a plurality of current mirror circuits, each of which includes at least two transistors, and the state detecting circuit includes a comparator circuit formed by a plurality of transistors, so that the ring trip circuit is formed in a small size and is adaptive to be formed by a large scale integrated circuit.

According to one aspect of the present invention, the voltage detecting circuit includes a first current switching circuit operatively connected to one end of the ringer sending resistor, and having first to third ports, the first current switching circuit flowing a first current from the second port to the third port when a voltage at one end of the ringer sending resistor is positive, or flowing the first current from the first port to one end of the ringer sending resistor through the third port when the voltage at one end of the ringer sending resistor is negative, a second current switching circuit operatively connected to another end of the ringer sending resistor, and having first to third ports, the second current switching circuit flowing a second current from the second port to the third port when another voltage at another end of the ringer sending resistor is positive, or flowing the second current from first port and flowing the same to another end of the ringer sending resistor through the third port when the another voltage at another end of the ringer sending resistor is negative, a first current mirror circuit having a first terminal connected to the first port of the first current switching circuit and a second terminal, a second current mirror circuit having a first terminal connected to the second port of the first current switching circuit and a second terminal connected to the second terminal of the first current mirror circuit, a third current mirror circuit having a first terminal connected to the first port of the second current switching circuit and a second terminal, a fourth current mirror circuit having a first terminal connected to the second port of the second current switching circuit and a second terminal, a fifth current mirror circuit having a first terminal connected to the second terminal of the fourth current mirror circuit and a second terminal, and a sixth current mirror circuit having a first terminal connected to the second terminal of the third current mirror circuit and a second terminal. A commonly connected point of the second terminals of the first and second current mirror circuits, and the second terminals of the fifth and sixth current mirror circuits are commonly connected to output a current corresponding to a voltage difference between one and another ends of the ringer sending resistor.

The voltage detecting circuit further includes a voltage conversion circuit, operatively connected to the common connected point, for converting the current to a voltage, outputting the same, and having an output terminal of the voltage detecting circuit.

The first current switching circuit includes an npn-type transistor and a pnp-type transistor, a collector of the npn-type transistor is the first port, emitters of the transistors are commonly connected, a common connected point is operatively connected to one end of the ringer sending resistor, a collector of the npn-type transistor is the second port, and bases of the transistors are supplied with a first voltage.

Also, the second current switching circuit having a circuit construction the same as the first switching circuit.

Each of the current mirror circuits includes first and second npn-type transistors, a collector of the first transistor being the first terminal, a collector of the second transistor being the second terminal, bases of the transistors being commonly connected and connected to the collector of the first transistor, and emitters of the transistors being supplied with a second voltage.

Preferably, each of the current mirror circuits further includes a third pnp-type transistor, a base being connected to the collector of the first transistor, an emitter being connected to the base common connected point of the first and second transistors, and a collector being supplied with a third voltage.

Each of the current mirror circuits further includes a first resistor connected to the emitter of the first transistor, and a second resistor connected to the emitter of the second transistor.

The voltage conversion circuit includes a voltage conversion resistor, operatively connected to the common connected point, for converting the current from the common connected point to a voltage and functioning as the output terminal of the voltage detecting circuit. The voltage conversion circuit further includes a capacitor parallel-connected to the voltage conversion resistor.

The state detecting circuit includes a differential amplifier, a first input terminal connected to the output terminal of the voltage detecting circuit, a voltage limiter connected to the first input terminal of the differential amplifier, a threshold voltage supplying circuit connected to a second input terminal of the differential amplifier, and a current source circuit connected to the differential amplifier for supplying a constant current thereto.

The ring trip circuit further include a first dropping resistor connected between one end of the ringer sending resistor and the third port of the first current switching circuit, and a second dropping resistor connected between another end of the ringer sending resistor and the third port of the second current switching circuit.

The ring trip circuit further include a filtering capacitor connected between ends of the first and second dropping resistors, which ends are adjacent to the third ports of the first and second current switching circuits.

The ring trip circuit further includes a scan output circuit connected to the state detecting circuit and outputting a digital detection signal in response to an on-hook state or an off-hook state.

According to another aspect of the present invention, the voltage detecting circuit includes a current difference detecting circuit, operatively connected between ends of ringer sending resistor, for detecting a difference of currents extracted from one end and another end of the ringer sending resistor, an absolute calculation circuit, operatively connected to the current difference detecting circuit, for calculating an absolute of the current difference, and a voltage conversion circuit, operatively connected to the absolute calculation, for converting the absolute current to a voltage, outputting the same, and having an output terminal of the voltage detecting circuit.

The current difference detecting circuit includes a current inversion circuit, operatively connected to the one end of the ringer sending resistor, for inverting the first current extracted from one end of the ringer sending resistor, and an addition circuit, operatively connected to the current inversion circuit and another end of the ringer sending resistor, for adding the inverted first current and the second current flowing through another end of the ringer sending resistor.

The current inversion circuit includes a first current switching circuit operatively connected to one end of the ringer sending resistor, and having first to third ports, the first current switching circuit flowing a first current from the second port to the third port when a voltage at one end of the ringer sending resistor is positive, or flowing the first current from the first port to one end of the ringer sending resistor through said third port when the voltage at the one end is negative, a first current mirror circuit having a first terminal connected to the first port of the first current switching circuit and a second terminal, and a second current mirror circuit having a first terminal connected to the second port of the first current switching circuit and a second terminal connected to the second terminal of the first current mirror circuit. The addition circuit includes a line operatively connected to another end of the ringer sending resistor, and another line connected to the common connected point of the second terminals of the first and second current mirror circuits, and connected to the line.

The absolute calculation circuit includes a second current switching circuit connected to the addition circuit, and having first to third ports, the second current switching circuit flowing a third current, which is a difference current between the first current and the second current, extracted from another end of the ringer sending resistor, from the first port to said second port when another voltage at another end of the ringer sending resistor is positive, or flowing the third current from the second port to the third port when the another voltage is negative, and a third current mirror circuit having a first terminal connected to the third port of the second current switching circuit and a second terminal connected to the first port of the second current switching circuit.

The voltage conversion circuit includes a fourth current mirror circuit having a first terminal connected to the first port of the second current switching circuit, and a second terminal, and a voltage conversion resistor connected to the second terminal of the fourth current mirror circuit and converting a current therefrom to a voltage.

BRIEF DESCRIPTION OF DRAWINGS

FIGS. 3a and 3b are circuit diagrams explaining states on-hook and off-hook states of a subscriber telephone;

FIGS. 4a and 4b are graphs explaining the detection of on-hook and off-hook states by a ring trip circuit;

FIGS. 6a and 6b, and 7a and 7b are block diagrams explaining the operation of the ring trip circuit shown in FIGS. 5a and 5b;

DESCRIPTION OF THE PREFERRED EMBODIMENTS

Before describing the preferred embodiments of the present invention, examples of a prior art ring trip circuit are described with reference to the drawings.

Figure 1:
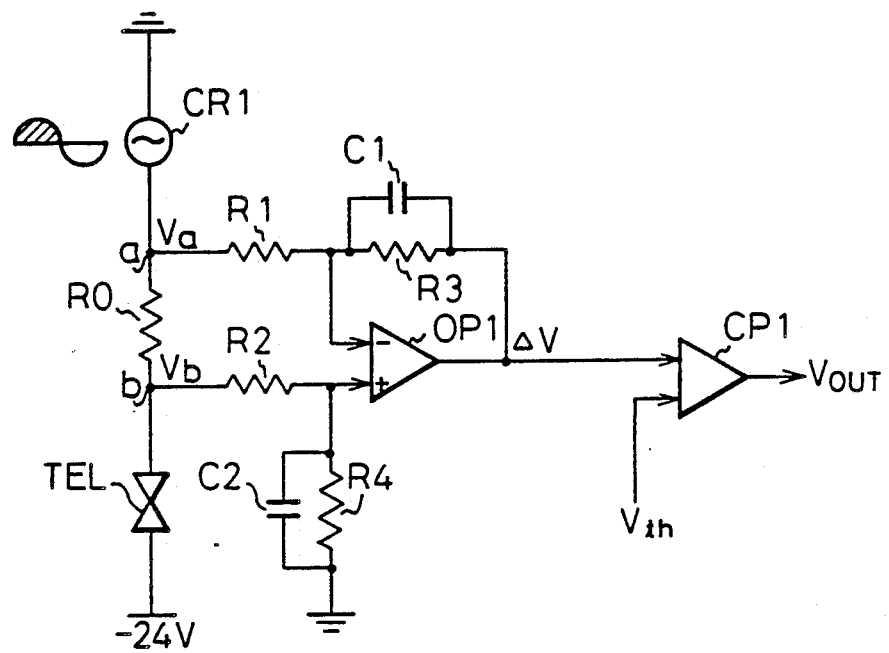
FIGS. 1 and 2 are circuit diagrams of prior art ring trip circuits.

FIG. 1 shows a prior art ring trip circuit of a −24 volt feed type. In FIG. 1, reference CR1 denotes a ringer source, reference R0 denotes a ringer sending resistor R0, and reference TEL denotes a subscriber telephone. The ringer trip circuit includes dropping resistors R1 and R2, an operational amplifier OP1, a resistor R3 connected between an inverting terminal of the operational amplifier OP1 and an output terminal thereof, a capacitor C1, a dropping resistor R4, and a capacitor C2. The ringer trip circuit also includes a comparator CP1. Voltages $V_a$ and $V_b$ at both ends of the ringer sending resistor R0 are supplied to the inverted and non-inverted input terminals of the operational amplifier OP1 through the dropping resistors R1 and R2. The operational amplifier OP1 cooperates with the resistor R3, and the resistor R4, and functions as a differential amplifier. Since an AC voltage having a high amplitude from the ringer source CR1 is superimposed on the DC feed voltage, and applied to the operational amplifier OP1, in order to avoid a malfunction due to the above high AC voltage, the capacitors C1 and C2 are connected to the resistors R3 and R4 in parallel, respectively, and function as low pass filters for rejecting the high AC voltage. The operational amplifier OP1 calculates a voltage difference $\Delta V$ between the above voltages $V_a$ and $V_b$: $\Delta V = V_a - V_b$. The comparator CP1 compares the voltage difference $\Delta V$ with a threshold voltage $V_{th}$.

Figure 2:
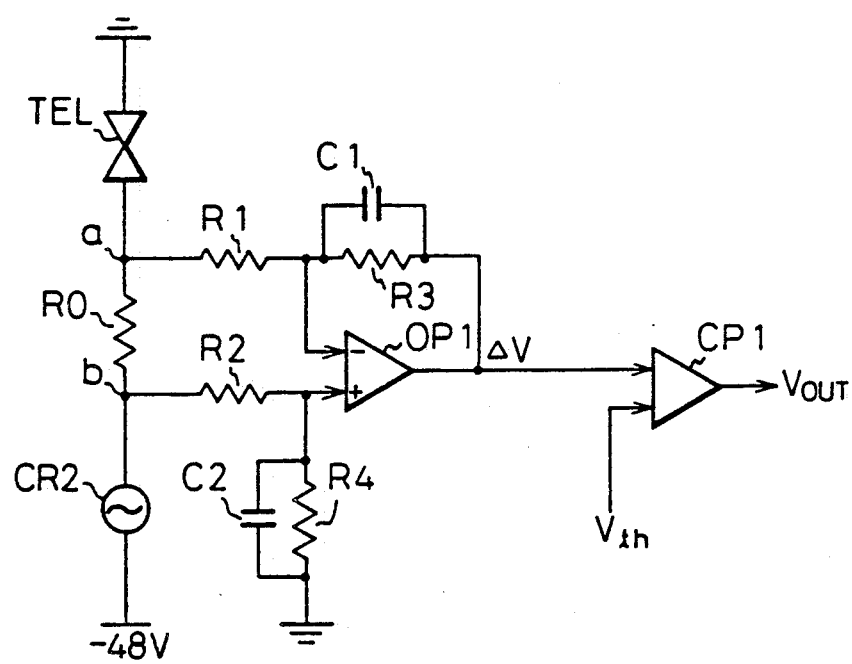

FIG. 2 shows another prior art ring trip circuit of a $-48$ volt feed type. In FIG. 2, the connection of the telephone TEL, the ringer sending resistor R0 and a ringer source CR2 is the reverse of that in FIG. 1, however, the configuration of the ring trip circuit, is substantially the same as that of FIG. 1.

The operation of the ring trip circuit shown in FIG. 2 will be described with reference to FIGS. 3a and 3b, and FIGS. 4a and 4b. FIGS. 3a and 3b show equivalent circuits of the subscriber telephone TEL when in an on-hook state and an off-hook state. When the telephone TEL is in the on-hook state, i.e., a call has been received, but the subscriber has not yet picked-up a transmitter and receiver for response, an internal impedance of the telephone TEL is large, as shown in FIG. 3a. The internal impedance is defined by a series-connected circuit of an internal resistor R, an internal inductor L and an internal capacitor C. Conversely, when the telephone TEL becomes in the off-hook state, and the transmitter and receiver is picked-up, the internal impedance of the telephone becomes small, as shown in FIG. 3b, the internal impedance is defined by only the internal resistor R.

When in the on-hook state, the AC voltage from the ringer source CR2 is reduced by the internal capacitor, and the DC voltage from a voltage feeder (not shown) is also reduced, and therefore, the voltage difference between the ends of the ringer sending resistor R0 is small, as shown in FIG. 4a. On the contrary, when in the off-hook state, the voltage difference is large and the AC voltage is superimposed on the DC voltage from the voltage feeder without reduction.

The operational amplifier OP1 provides the above DC voltage difference. The comparator CP1 compares the DC voltage difference with the threshold voltage $V_{th}$, and outputs a high level signal when the telephone TEL is in the off-hook state, and otherwise, outputs a low level signal. The high or low level signal indicates the off-hook state or the on-hook state.

The ringer source CR2 outputs an AC voltage having a large amplitude of, for example, AC 100 V, and a low frequency, for example, approximately 16 to 20 Hz. As a result, the resistors R1, R2, R3 and R4 must have a large resistance, and the capacitors C1 and C2 also must have a large capacitance. Below are example of the above resistors and the capacitors.

resistance of R1: 1 MΩ
resistance of R2: 1 MΩ
resistance of R3: 100 kΩ
resistance of R4: 100 kΩ
capacitance of C1: 1 μF
capacitance of C2: 1 μF As described above, since a large number of the ring trip circuits are provided in the telephone exchanger, the ring trip circuit must be as small as possible and as low cost as possible. In addition, the ring trip circuit(s) should be formed by an LSI. However, the above large resistors and the large capacitors can not be substantially formed by the LSI. Thus, the prior art, ring trip circuit must be formed by individual circuit elements. This results in a bulky size and a high cost.

The present invention overcomes the above defects.

The principle of the detection of the on-hook state or the off-hook state, is substantially the same as that described above. The present invention is intended to provide an improved ring trip circuit which introduces a new circuit technology devised to eliminate the large resistors and the large capacitors.

Now, preferred embodiments of the present invention will be described.

Figure 5A:
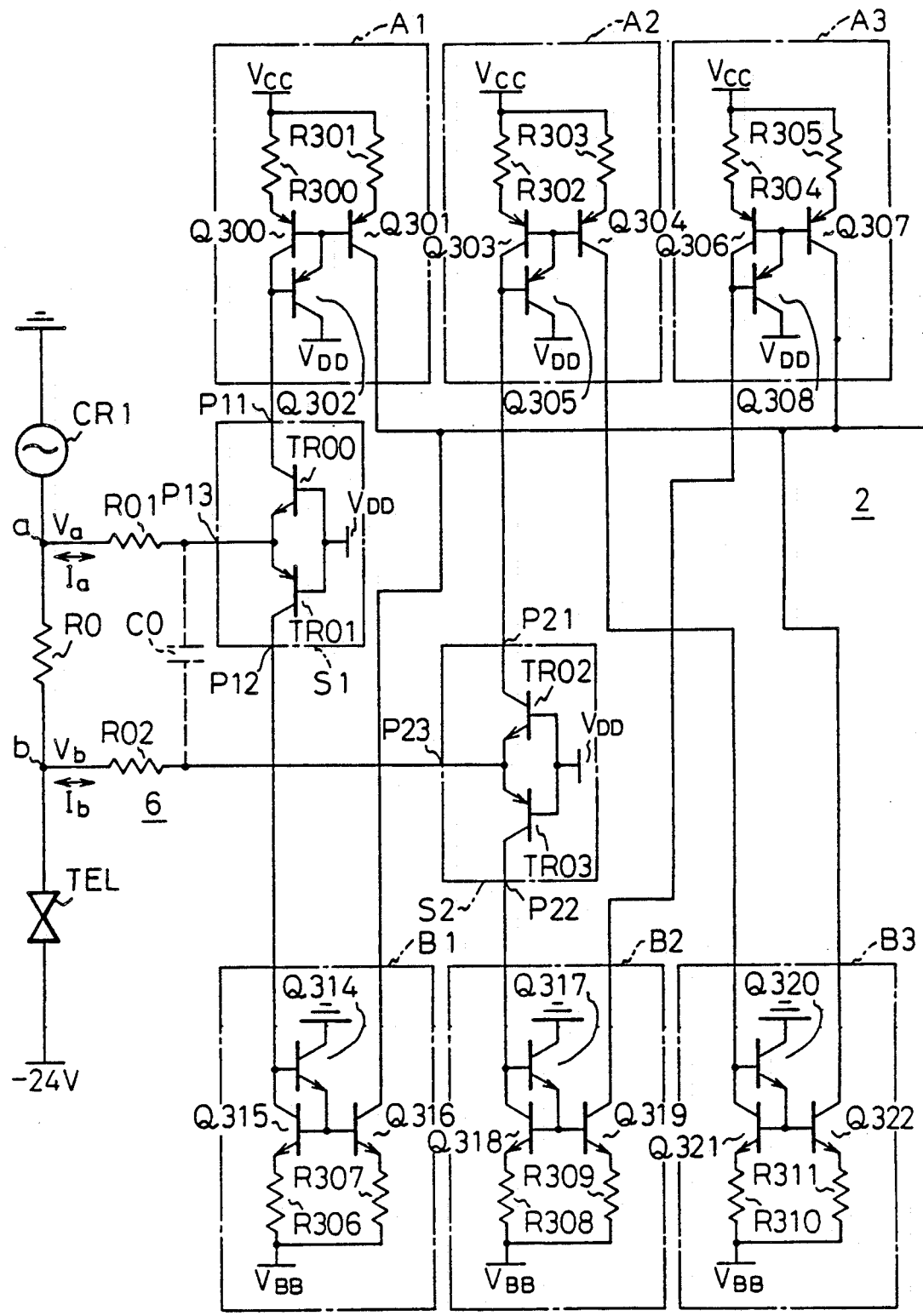
FIGS. 5a and 5b are circuit diagrams of a first embodiment of a ring trip circuit in accordance with the present invention.
Figure 5B:
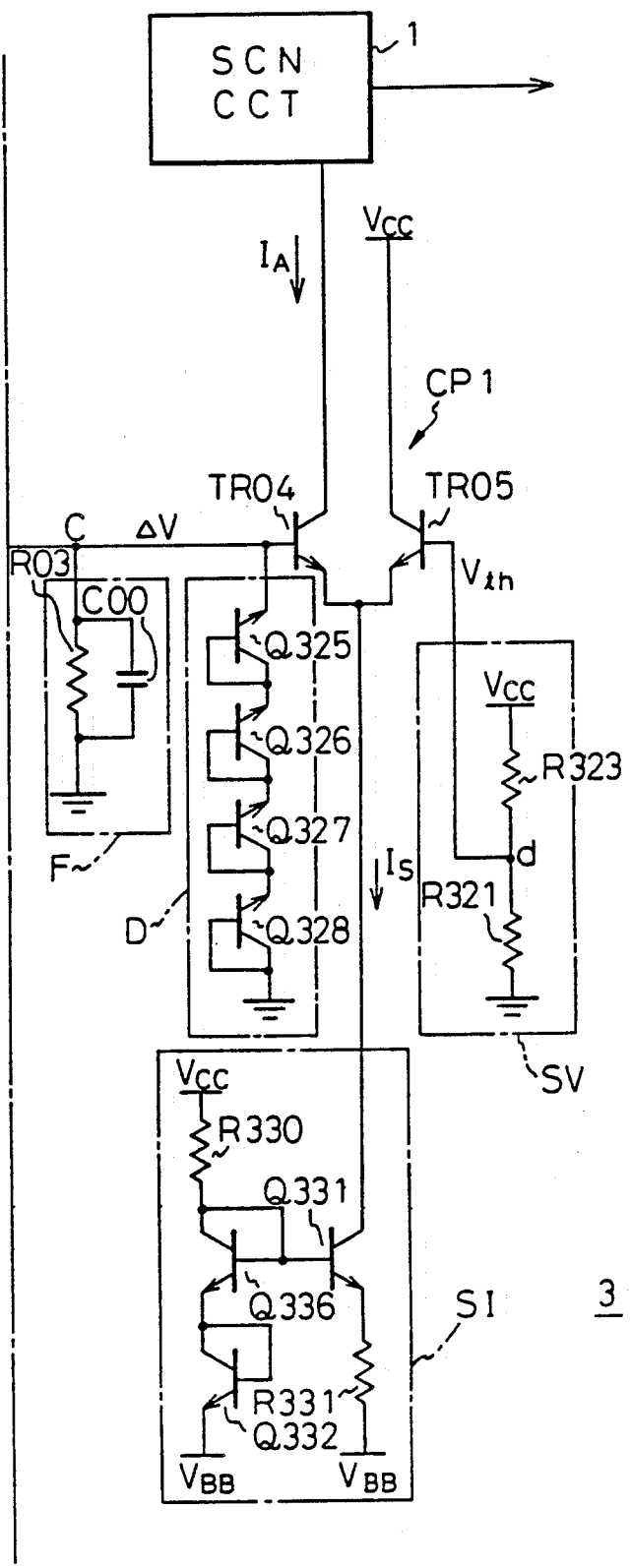

FIGS. 5a and 5b show a circuit diagram of a first embodiment of a ring trip circuit in accordance with the present invention. In FIG. 5, the ringer source CR1, the ringer sending resistor R0, and the telephone TEL are same as those shown in FIG. 1. The feed voltage is also $-24$ V. These circuits, except for the telephone TEL, are provided in the telephone exchanger.

The ringer trip circuit shown in FIG. 5 includes an input circuit 6, a voltage detecting circuit 2, a state detecting circuit 3, and a scan output circuit 1.

The input circuit 6 includes a first dropping resistor R01 connected to one end a of the ringer sending resistor R0, and a second dropping resistor R02 connected to another end b of the ringer sending resistor R0. Preferably, a filtering capacitor C0 is connected between the first and second resistors R01 and R02, as shown in FIG. 1.

The voltage detecting circuit 2 includes a first current switching circuit S1 connected to one end a of the ringer sending resistor through the resistor R01, and having first to third ports P11, P12 and P13, and a second current switching circuit S2 connected to another end b of said ringer sending resistor through the resistor R02, and having first to third ports P21, P22 and P23. The voltage detecting circuit 2 includes a first current mirror circuit A1 having a first terminal connected to the first port P11 of the first current switching circuit S1 and a second terminal, and a second current mirror circuit B1 having a first terminal connected to the second port P12 of the first current switching circuit S1 and a second terminal connected to the second terminal of the first current mirror circuit. The voltage detecting circuit 2 further includes a third current mirror circuit A2 having a first terminal connected to the first port P21 of the second current switching circuit S2 and a second terminal, and a fourth current mirror circuit B2 having a first terminal connected to the second port P22 of said second current switching circuit S2 and a second terminal. Furthermore, the voltage detecting circuit 2 includes a fifth current mirror circuit A3 having a first terminal connected to the second terminal of the fourth current mirror circuit B2 and a second terminal, and a sixth current mirror circuit B3 having a first terminal connected to the second terminal of the third current mirror circuit A2 and a second terminal. A commonly connected point of the second terminals of the first and second current mirror circuits A1 and B1, and the second terminals of the fifth and sixth current mirror circuits A3 and B3 are commonly connected to output a current corresponding to a voltage difference between one and another ends a and b of the ringer sending resistor.

The voltage detecting circuit 2 further includes a voltage conversion circuit F having a filtering function and connected to the common connected point, for converting the current to a voltage, outputting the same, and having an output terminal of the voltage detecting circuit 2.

The state detecting circuit 3 includes a differential amplifier CP1, a first input terminal thereof connected to the output terminal a of the voltage detecting circuit, a voltage limiter D connected to the first input terminal of the differential amplifier, a threshold voltage supplying circuit SV connected to a second input terminal of the differential amplifier, and a current source circuit SI connected to the differential amplifier for supplying a constant current thereto.

The first current switching circuit S1 includes series-connected npn-type transistor TR00 and a pnp-type transistor TR01. A collector of the transistor TR00 is the first port P11. Emitters of the transistors are commonly connected to one end of the ringer sending resistor R0 through the resistor R01. A collector of the transistor TR01 is the second port P12. Bases of the transistors TR00 and TR01 are supplied with a drive voltage $V_{DD}$. Since the complementary operation transistors TR00 and TR01 are serially connected, and the third port P13, which is the common connected point of the emitters, is connected to one end a of the ringer sending resistor R0 through the resistor R01, the first current switching circuit Sl flows a first current $I_a$ from the second port P12 to the third port P13 when a voltage $V_a$ at one end a of the resistor R0 is positive, or flows the first current from the first port P11 through the third port P13 to the one end a when the voltage $V_a$ at the one end a is negative.

The second current switching circuit S2 has the same circuit construction as that of the first current switching circuit S1, and thus the operation thereof is similar to that of the first current switching circuit S1.

Each of the first, third and fifth current mirror circuits A1, A2 and A3, for example, the first current mirror circuit A1, includes first and second npn-type transistors Q300 and Q301. A collector of the first transistor Q300 is the above first terminal, a collector of the second transistor Q301 is the second terminal, bases of the transistors are commonly connected and connected to the collector of the first transistor, and emitters of the transistors are supplied with a voltage $V_{CC}$. Each of the first to sixth current mirror circuits A1 to B3 may further include a third pnp-type transistor, for example, Q302. A base of the transistor Q302 is connected to the collector of the first transistor Q300, an emitter thereof is connected to the common connected point of the bases of the first and second transistors Q300 and Q301, and a collector thereof is supplied with a third voltage $V_{DD}$. The first current mirror circuit A1 includes a first resistor R300 connected to the emitter of the first transistor Q300, and a second resistor R301 connected to the emitter of the second transistor Q301.

Each of the second, fourth and sixth current mirror circuits B1, B2 and B3 also has a circuit construction similar to that of the first current mirror circuit A1, except that, for example, a collector of a third pnp-type transistor Q314 in the second current mirror circuit B1 is grounded and emitters of the first and second transistors Q315 and Q316 are supplied with a voltage $V_{BB}$.

The current mirror circuit A1 outputs an output current equal to an input current flowing through the first terminal, i.e., the collector of the transistor Q300, from the second terminal, i.e., the collector of the transistor Q301. By providing the third transistor Q302, a balance of the input current and the output current is improved. Other current mirror circuits operate in the same way as above.

The voltage conversion circuit F consists of parallel connected resistor R03 and capacitor C00. The resistor R03 converts the current passing through the common connected point c to a voltage $\Delta V$. The resistor R03 also cooperates with the capacitor C00 and functions as a filter.

The differential amplifier CP1, functioning as the comparator, consists of two npn-type transistors TR04 and TR05 connected in parallel.

The voltage limiter D is composed of series-connected transistors Q325 to Q328, each connected to function as a diode. The voltage limiter D shifts a level at a base of the transistor TR04 of the differential amplifier OP1 to protect the transistor TR04 against a high voltage from the point c.

The current source circuit SI is also formed by a current mirror circuit, consisting of transistors Q330 to Q332, and resistors R330 and R331.

The threshold voltage supplying circuit SV is composed of two series-connected dividing resistors R323 and R324 supplied with a constant voltage $V_{CC}$ therebetween to supply a threshold voltage $V_{th}$ from a common connected point d of the resistors to the second input terminal of the differential amplifier, i.e., a base of the transistor TR05.

The circuit parameters of the circuits in FIG. 5 are shown below:
resistance of the resistor R0: 600Ω
resistance of the resistor R01 and R02; 100 kΩ
capacitance of the capacitor C0: 1 μF
resistance of the resistors in each current mirror circuit, for example, R300 and R301: 2 kΩ
resistance of the resistor R03: 100 kΩ
capacitance of the capacitor C00: 1 μF
resistance of the resistor R330: 20 kΩ
resistance of the resistor R331: 10 kΩ
resistance of the resistor R323; 3 kΩ
resistance of the resistor R331: 2 kΩ
$V_{BB}$: −24 VDC
$V_{DD}$: −5 VDC
$V_{CC}$: +5 VDC
$V_{th}$: +2 VDC
$I_s$: 60 μA Compared FIG. 1 with FIGS. 5a and 5b, the four large resistors R1, R2, R3 and R4 in FIG. 1 are reduced to two resistors R01 and R02, and the large capacitors C1 and C2 are reduced to one capacitor C00, or optionally, to two capacitors C00 and C0.

There are no large resistors or any capacitors, and thus the first to sixth current sources A1 to A3, and B1 to B3, the first and second current switch circuits S1 and S2, the differential amplifier CP1, the voltage limiter D, the current source SI, and the threshold voltage supplying circuit SV, can be easily formed by an LSI. The scan output circuit 1 also can be formed by transistors and small resistors, and thus incorporated with the above circuits in the LSI. One LSI chip may include a plurality the above LSI circuits, and a plurality of LSI chips can be mounted on a printed circuit board (PCB).

When the input circuit 6 is not provided with the capacitor C0, the input circuit 6 can be formed by the LSI.

The voltage conversion circuit F should be provided outside of the LSI chip and the PCB, because the voltage conversion circuit 8 includes the large capacitor C00.

Referring to FIGS. 6a and 6b, and FIGS. 7a and 7b, the operation of the ring trip circuit shown in FIGS. 5a and 5b will be described.

Figure 6A:
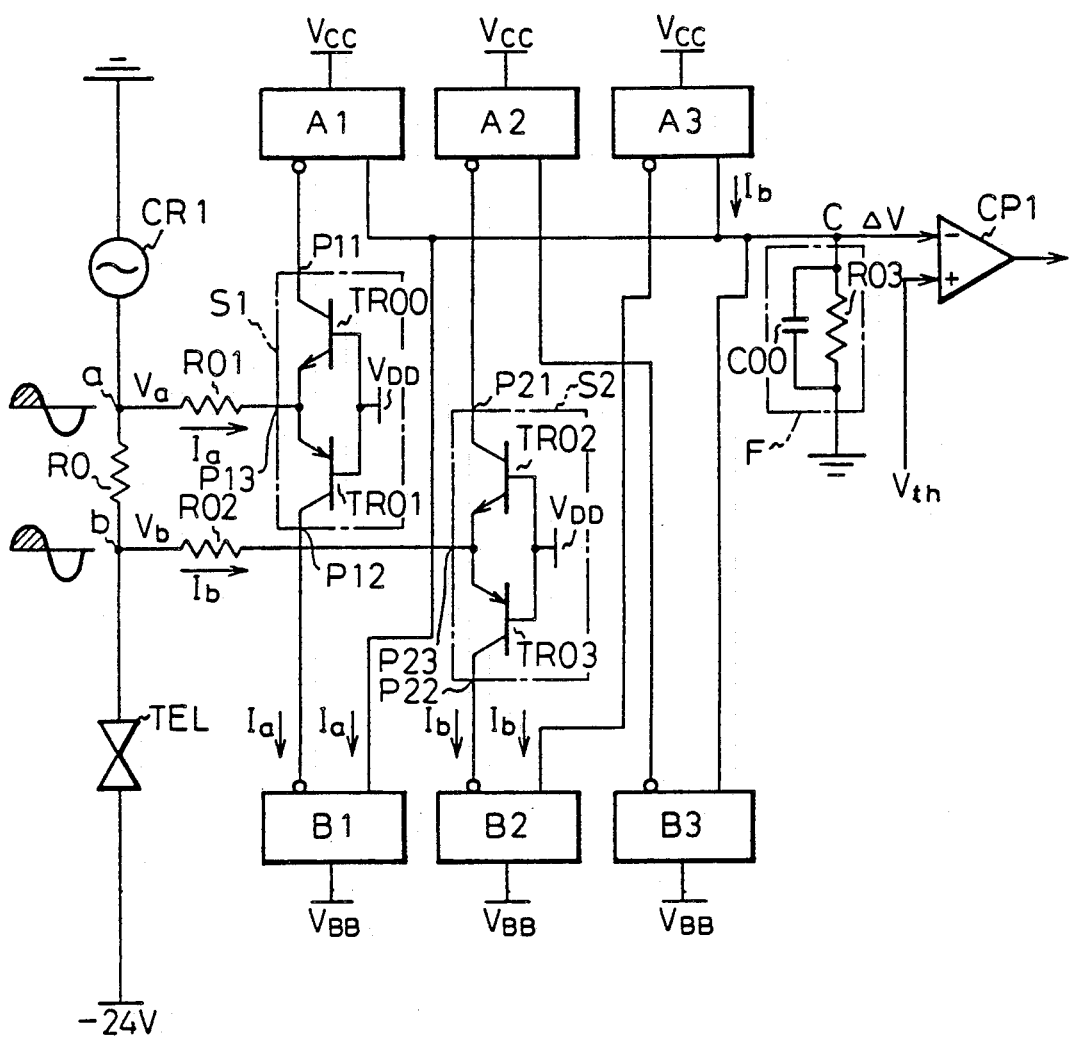
Figure 6B:
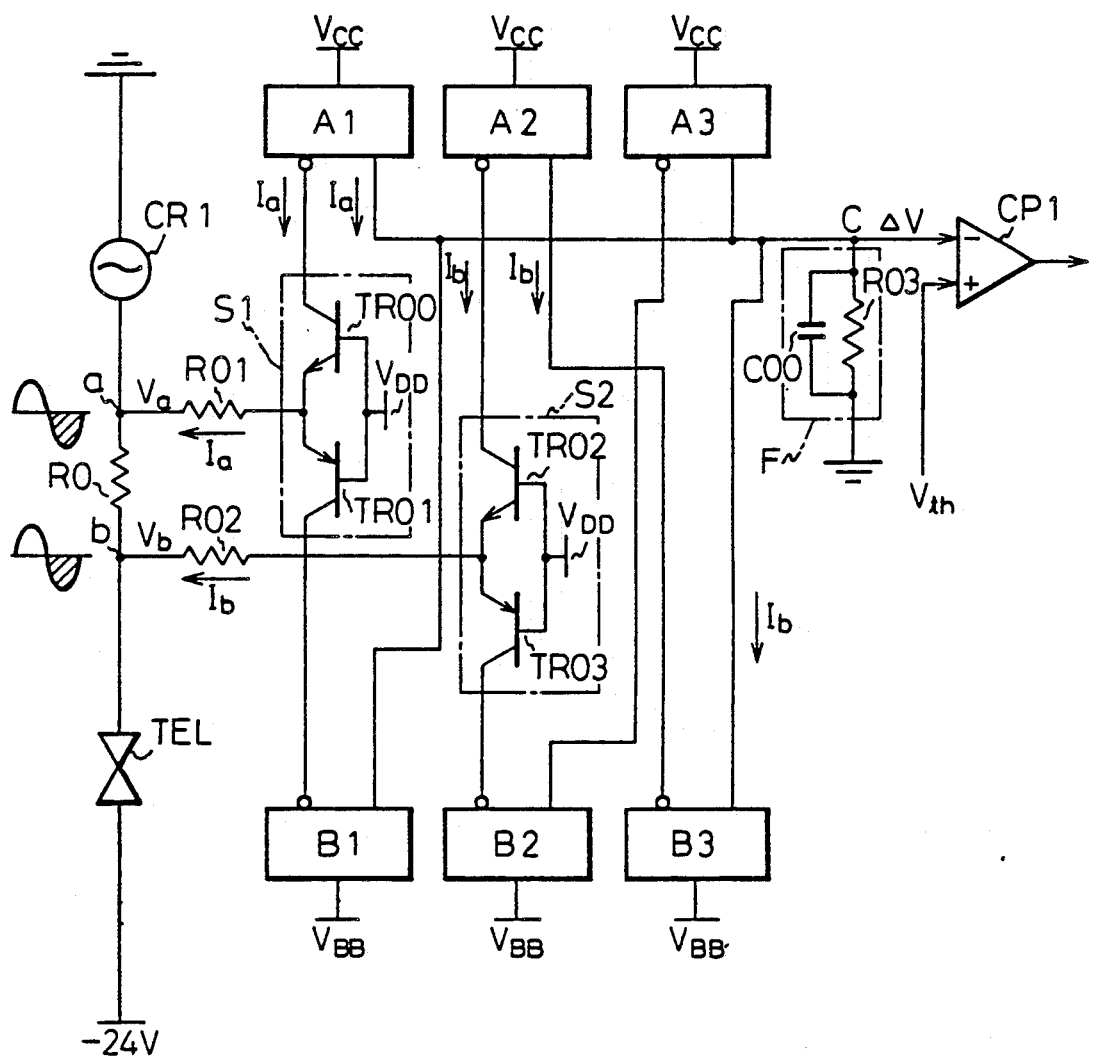
Figure 7B:
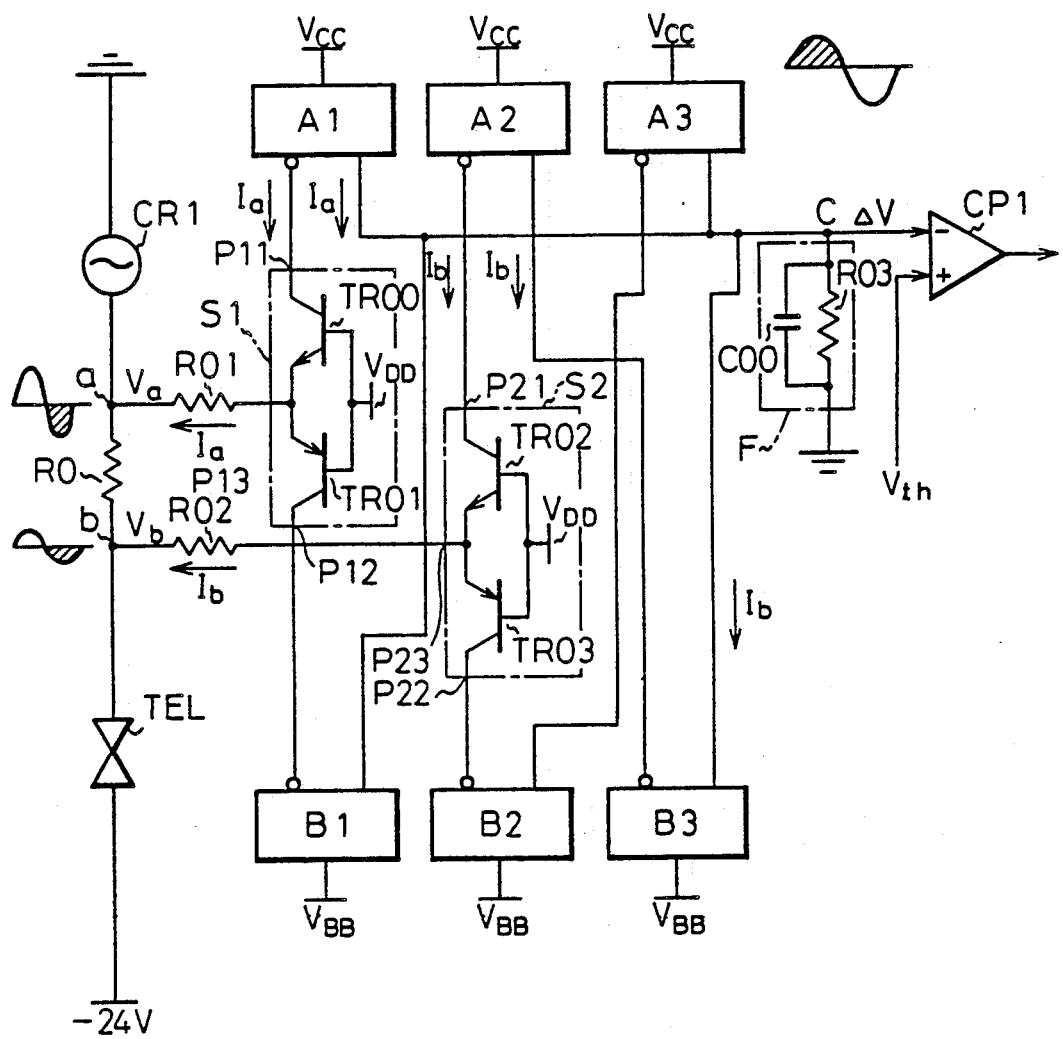

FIGS. 6a and 6b show the circuit condition when the telephone TEL is in the on-hook state. FIGS. 7a and 7b show the circuit condition when the telephone TEL is in the off-hook state. In the drawings, shaded waves represent ringer voltages. Also, terminals having small circles of the current mirror circuits A1 to B3 represent the first terminals, other terminals having not small circles represent the second terminals.

FIG. 6a shows the circuit condition when the telephone TEL is in the on-hook state and a positive ringer voltage is supplied to the ringer sending resistor R0. In FIG. 6a, the voltage $V_a$ is higher than the voltage $V_{DD}$ supplied to the base of the transistor TR01 in the first current switching circuit S1, and thus the transistor TR01 is turned ON, allowing the first current $I_a$ to flow from one end a of the ringer sending resistor R0 to the first terminal of the second current mirror circuit B1 through the resistor R01 and the transistor TR01. The current mirror circuit B1 extracts a current equal to the first current $I_a$ into the second terminal. Similarly, the voltage $V_b$ is higher than the voltage $V_{DD}$ supplied to the base of the transistor TR03 in the second current switching circuit S2, and thus the transistor TR03 is turned ON, allowing the second current $I_b$ to flow from another end b of the ringer sending resistor R0 to the first terminal of the fourth mirror circuit B2 through the resistor R02 and the transistor TR03. The current mirror circuit B2 also extract a current equal to the second current $I_b$ into the second terminal from the first terminal of the fifth current mirror circuit A3. The current mirror circuit A3 outputs a current equal to the second current $I_b$ extracted from the first terminal, from the second terminal. Since the transistors TR00 and TR02 are turned OFF, the first and third current mirror circuits A1 and A2 are in an inoperable state, and accordingly, the sixth current mirror circuit B3 is in an inoperable state. As a result, at point c, the current $I_b$ from the second terminal of the fifth current mirror circuit A3 is subtracted from the current $I_a$ from the second terminal of the second current mirror circuit B1, i.e., $\Delta I = I_b - I_a$ is obtained. The current difference $\Delta I$ is converted to the voltage difference $\Delta V$ at the voltage converting circuit f. Since the telephone TEL is in the on-hook state, both of the voltages $V_a$ and $V_b$ are low level and approximately equal. Namely, $V_a \approx V_b$, $I_a \approx I_b$, $\Delta I \approx 0$, and $\Delta V \approx 0$. The voltage difference $\Delta V$ is lower than the threshold voltage $V_{th}$. The comparator CP1 detects the on-hook state, and outputs a low level signal of 0 V.

FIG. 6b shows the current condition when the telephone TEL is in the on-hook state, and a negative ringer voltage is supplied to the ringer sending resistor R0. In this case, the first, the third and the sixth current mirror circuits A1, A2 and B3 are operated. Conversely, the current mirror circuits B1, B2, and A3 are in an inoperable state. At point c, the current $I_a$ from the second terminal of the first current mirror circuit A1 is subtracted from the current $I_b$ flowing into the second terminal of the sixth current mirror circuit B3, i.e., $I = I_a - I_b$ is obtained. As described above with reference to FIG. 6b, $\Delta I \approx 0$, and $V \approx 0$. The comparator CP1 also detects the on-hook state.

FIG. 7a shows the circuit condition when the telephone TEL is in the off-hook state and a positive ringer voltage is supplied. The operational condition of the current switching circuits S1 and S2, and the current mirror circuits A1 to B3 is same as that of FIG. 6a, however, in this case, the resistance R in FIG. 3b is approximately 100 Ω, and a high ringer voltage is supplied to the ringer sending resistor R0. As a result, a voltage difference between the voltages $V_a$ and $V_b$ becomes large, and a large current difference $\Delta I = I_b - I_a$ ($\Delta I < 0$) is obtained. The current difference $\Delta I$ is converted into the voltage difference $\Delta V$ having an amplitude higher than the threshold voltage $V_{th}$ at the voltage converting circuit f. The comparator CP1 detects the off-hook state.

FIG. 7b shows the circuit condition when the telephone TEL is in the off-hook state, and a negative voltage is supplied to the ringer sending resistor R0. The operational condition is same as that of FIG. 6b. A large current difference $\Delta I = I_a - I_b$ ($\Delta I > 0$) is obtained, and the off-hook state is detected.

In FIGS. 7a and 7b, since a polarity of the voltage difference $\Delta V$ is reversed, and a single comparator CP1 is provided, an absolute circuit should be provided at an input portion of the comparator CP1. The absolute circuit will be described with reference to FIG. 9.

The scan output circuit 1 shown in FIG. 5b outputs a digital detection signal in response to the on-hook state or the off-hook state.

Figure 8:
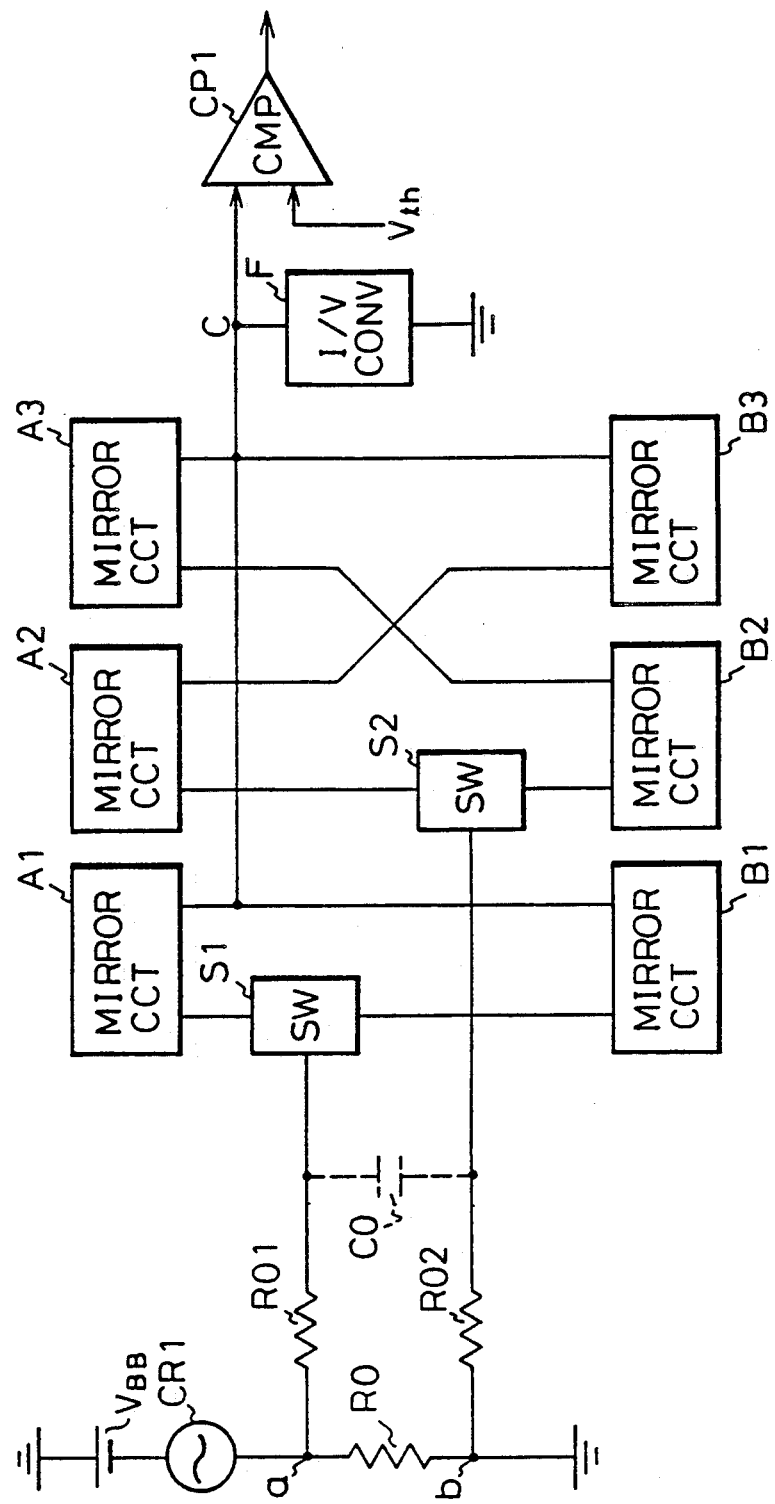
FIG. 8 is a block diagram of a modification of the first embodiment shown in FIGS. 5a and 5b.

FIG. 8 shows a modification of the ring trip circuit shown in FIGS. 5a and 5b. In FIG. 8, a feed voltage $V_{BB}$ is provided between the ground and the ringer source CR1, and another end b of the ringer sending resistor R0 is grounded. The ring trip circuit is similar to that shown in FIGS. 5a and 5b.

Figure 9:
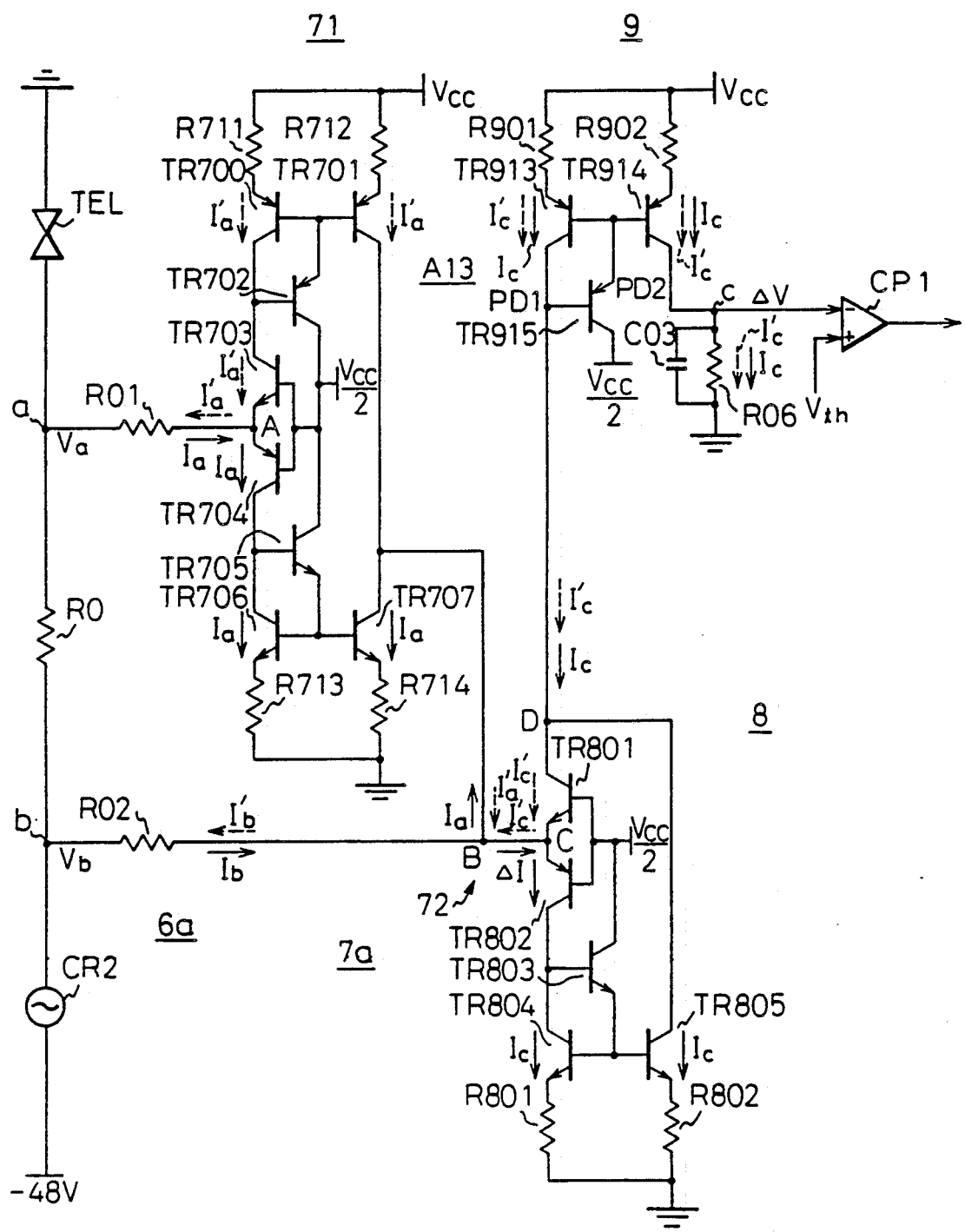
FIG. 9 is a circuit diagram of a second embodiment of a ring trip circuit in accordance with the present invention.

FIG. 9 shows a circuit diagram of a second embodiment of a ringer trip circuit of the present invention. The ringer trip circuit is of a −48 V feed type.

In FIG. 9, the ring trip circuit includes an input circuit 6a similar to the input circuit 6 in FIG. 5a, a current difference detecting circuit 7a, an absolute calculation circuit 8a, a voltage conversion circuit 9a, a state detecting circuit 3a (not shown) including the comparator CP1, and a scan output circuit 1a (not shown). The state detecting circuit 3a and the scan output circuit 1a are similar to those in FIG. 5b.

The current difference detecting circuit 7a includes a current inversion circuit 71 for inverting the first current $I_a$ extracted from one end a of the ringer sending resistor R0, and an addition circuit 72 for adding the inverted first current $-I_a$ and the second current $I_b$ extracted from another end b of the ringer sending resistor R0.

The current inversion circuit 71 includes a current switching circuit S11, a first current mirror circuit A11, and a second current mirror circuit B11.

The current switching circuit S11 is composed of series-connected npn-type transistor TR703 and pnp-type transistor TR704. A collector of the npn-type transistor TR703 is a first port PA1, emitters of the transistors are commonly connected, a common connected point PA2 is operatively connected to one end a of the ringer sending resistor R0, a collector of the npn-type transistor TR704 is a second port PA3, bases of the transistors are supplied with a voltage of $V_{CC}/2$. The first current mirror circuit A11 is composed of transistors TR700 to TR702, and resistors 711 and 712. The second current mirror circuit B11 is composed of transistors TR705 to TR707, and resistors R713 and R714.

The current switching circuit S11, and the first and second current mirror circuits A11 and B11 correspond to the first current switching circuit S1 and the first and second current mirror circuits A1 and B1, respectively. Accordingly, the current inversion circuit 71 outputs a first current $I_a$ corresponding to a voltage $V_a$ at point a, from a terminal commonly connected to collectors of the transistors TR701 and TR707, when $V_a < V_{CC}/2$, as shown by solid lines, and otherwise, extracts the first current $I_a$ into the terminal when $V_a \geq V_{CC}/2$, as shown by dotted lines.

The addition circuit 72 is a point B commonly connected by a line connected to the terminal of the circuit 71 and another line connected to the point b through the resistor R02. Accordingly, the addition circuit 72 calculates a current difference $\Delta I = I_a - I_b$ or $\Delta I = I_b - I_a$.

The Absolute calculation circuit 8a calculates an absolute of the current difference: $1I|$. The absolute calculation circuit 8a includes a second current switching circuit S22 similar to the first current switching circuit S11 in the circuit 71, and a third current mirror circuit A12 similar to the second current mirror circuit B11 in the circuit 71. Note that there is not provided with a current mirror circuit corresponding to the first current mirror circuit A11 in the circuit 71. Accordingly, the absolute calculation circuit 8a always extracts an absolute current $I_c$ equal to the current difference $\Delta I$.

The voltage conversion circuit 9a includes a fourth current mirror circuit A13 consisting of transistors TR913 to TR915, and resistors R901 and R902, and a filter F consisting of a dropping resistor R06 and a capacitor C03. The fourth current mirror circuit A13 functions as a current inversion circuit for supplying a positive polarity of the current difference $\Delta I$. The filter F always outputs a positive polarity of a voltage difference $\Delta V$.

The voltage difference $\Delta V$ is varied in response to the state of the telephone TEL, as described with reference to FIGS. 6a, 6b, 7a and 7b. The comparator CP1 detects the on-hook state or the off-hook state.

The resistances of the resistors R01, R02 and R06, and the capacitances of the capacitor C03 are almost the same as those in FIGS. 5a and 5b. Other circuit parameters are also similar to those in FIG. 5.

The ring trip circuit shown in FIG. 9 is also formed by an LSI in the same way to the ring trip circuit shown in FIG. 5.

Figure 10:
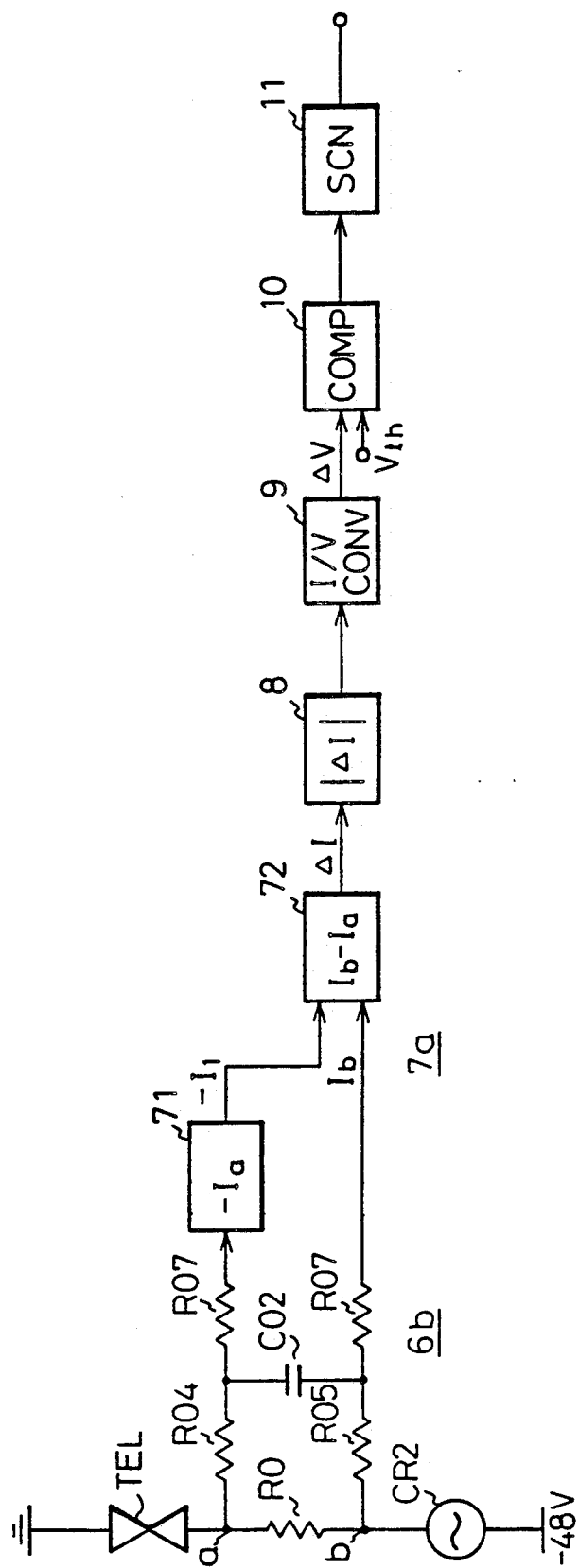
FIG. 10 is a block diagram of a modification of the second embodiment shown in FIG. 9.

FIG. 10 shows a modification of the ring trip circuit shown in FIG. 9. In FIG. 10, an input circuit 6b consists of resistors R04 to R07 and a capacitor C02, formed as a ladder and functioning a filter and a voltage dropper. In FIG. 10, resistance of the resistors R04 to R07 is 100 kΩ, and the capacitance of the capacitor C02 is 1 μF.

Many widely different embodiments of the present invention may be constructed without departing from the spirit and scope of the present invention. It should be understood that the present invention is not limited to the specific embodiments described in this specification, except as defined in the appended claims.

The ring trip circuit of the present invention is provided in a telephone exchanger and is applicable for detecting an on-hook state or an off-hook state of a subscriber telephone, or the like.

We claim:

1. A ring trip circuit for a subscriber telephone, the ring trip circuit operatively connected to a ringer sending resistor having first and second ends, the ringer sending resistor operatively connected between the subscriber telephone and a ringer source, said ring trip circuit comprising:
   voltage detecting means, operatively connected between the second and second ends of the ringer sending resistor, for detecting a voltage difference between the first and second ends of the ringer sending resistor and for converting the voltage difference to a current difference, the voltage difference varies in response to whether the subscriber telephone is in one of an on-hook state and an off-hook state, said voltage detecting means includes a plurality of current mirror circuits for the converting of the voltage difference to the current difference, each of the current mirror circuits formed by at least two transistors; and
   state detecting means, operatively connected to said voltage detecting means, for detecting one of the on-hook state and the off-hook state of the subscriber telephone based upon the voltage difference, said state detecting means including comparator means formed by a plurality of transistors,
   wherein said voltage detecting means includes at least
      a first current switching circuit operatively connected to the first end of the ringer sending resistor and having first to third ports, said first current switching circuit supplies a first current from the second port to the third port when a first voltage at the first end is positive, or supplies the first current from the first port to the first end through the third port when the first voltage at the first end is negative; and
   a second current switching circuit operatively connected to the second end of the ringer sending resistor and having first to third ports, said second current switching circuit supplies a second current from the second port to the third port when a second voltage at the second end is positive, or supplies the second current from the first port to the second voltage end through the third port when the second voltage at the second end is negative.
   wherein said plurality of current mirror circuits of said voltage detecting means includes at least
      a first current mirror circuit having a first terminal connected to the first port of said first current switching circuit and a second terminal;
      a second current mirror circuit having a first terminal Connected to the second port of said first current switching circuit and a second terminal connected to said second terminal of said first current mirror circuit at a common connection point;
      a third current mirror circuit having a first terminal connected to the first port of said second current switching circuit and a second terminal;
      a fourth current mirror circuit having a first terminal connected to the second port of said second current switching circuit and a second terminal;
      a fifth current mirror circuit having a first terminal connected to the second terminal of said fourth current mirror circuit and a second terminal connected to the common connection point; and
      a sixth current mirror circuit having a first terminal connected to the second terminal of said third current mirror circuit and a second terminal connected to the common connected point, wherein the common connection point of the second terminals of said first and second current mirror circuits and the second terminals of said fifth and sixth current mirror circuits is the current difference corresponding to the voltage difference between first and second ends of the ringer sending resistor, and wherein said ring trip circuit further comprises a voltage conversion circuit, operatively connected to the common connection point of the voltage detecting means, for converting the current difference to a reconstructed voltage difference and outputting the same.

2. A ring trip circuit according to claim 1, wherein said first current switching circuit comprises an npn-type transistor and a pnp-type transistor, a collector of said npn-type transistor being the first port, emitters of said transistors being commonly connected to the first end of the ringer sending resistor, a collector of said npn-type transistor being said second port, bases of said transistors being supplied with a first source voltage, and wherein said second current switching circuit comprises an npn-type transistor and a pnp-type transistor, a collector of said npn-type transistor being the first port, emitters of said transistors being commonly connected to the second end of the ringer sending resistor, a collector of said npn-type transistor being the second port, bases of said transistors being supplied with the first source voltage.

3. A ring trip circuit according to claim 2, wherein each of said first to sixth current mirror circuits comprise first and second transistors, a collector of said first transistor being the first terminal, a collector of said second transistor being the second terminal, bases of said first and second transistors being commonly connected and operatively connected to the collector of said first transistor, and emitters of said first and second transistors being supplied with one of a second source voltage and a third source voltage.

4. A ring trip circuit according to claim 3, wherein each of said first to sixth current mirror circuits further comprises a third transistor having a base connected to said collector of said first transistor, an emitter connected to the bases of said first and second transistors, and a collector supplied with one of a fourth and fifth source voltage.

5. A ring trip circuit according to claim 3 or 4, wherein each of said first to sixth current mirror circuits further comprises a first resistor connected to the emitter of said first transistor and a second resistor connected to the emitter of said second transistor.

6. A ringer trip circuit according to claim 1, wherein said voltage conversion circuit comprises a voltage conversion resistor, operatively connected to the common connected point of the voltage detecting means, for converting the current difference from the common connected point to the reconstructed voltage difference and functioning as an output terminal of said voltage detecting means.

7. A ring trip circuit according to claim 6, wherein said voltage conversion circuit comprises a capacitor parallel-connected to said voltage conversion resistor.

8. A ring trip circuit according to claim 7, wherein said voltage detecting means is formed as a large scale integrated circuit, except for said voltage conversion resistor and said capacitor of said voltage conversion circuit.

9. A ring trip circuit according to claim 1, wherein said state detecting means comprises:
a differential amplifier, a first input terminal connected to an output terminal of said voltage detecting means and a second input terminal;
a voltage limiter connected to the first input terminal of said differential amplifier;
a threshold voltage supplying circuit connected to the second input terminal of said differential amplifier; and
a current source circuit connected to said differential amplifier for supplying a constant current thereto.

10. A ring trip circuit according to claim 9,
wherein said differential amplifier comprises two npn-type transistors connected in parallel, having emitters commonly connected and connected to said current source circuit, a base of said first transistor being the first and input terminal, a base of said second transistor being the second input terminal, a collector of said first transistor being an output terminal of said differential amplifier, and a collector of said second transistor being supplied with a second voltage,
wherein said voltage limiter includes at least one transistor functioning as a level shift diode,
wherein said threshold voltage supplying circuit includes two series-connected resistors, supplied with the second voltage, for supplying a threshold voltage from an interconnection point of said resistors to the second input terminal of said differential amplifier, and
wherein said current source circuit includes a seventh current mirror circuit.

11. A ring trip circuit according to claim 10, wherein said state detecting means is formed as a large scale integrated circuit.

12. A ring trip circuit according to claim 1, further comprises input means including:
a first dropping resistor connected between the first end of the ringer sending resistor and the third port of said first current switching circuit; and
a second dropping resistor connected between the second end of the ringer sending resistor and the third port of said second current switching circuit.

13. A ring trip circuit according to claim 12, wherein said input means further includes a filtering capacitor connected between said first and second dropping resistors and connected to the third ports of said first and second current switching circuits.

14. A ring trip circuit for a subscriber telephone, the ring trip circuit operatively connected to a ringer sending resistor having first and second ends, the ringer sending resistor operatively connected between the subscriber telephone and a ringer source, said ring trip circuit comprising:
voltage detecting means, operatively connected between the first and second ends of the ringer sending resistor, for detecting a voltage difference between the first and second ends of the ringer sending resistor and for converting the voltage difference to a current difference the voltage difference varies in response to whether the subscriber telephone is in one of an on-hook state and an off-hook state, said voltage detecting means includes a plurality of current mirror circuits for the converting of the voltage difference to the current difference each of the current mirror circuits formed by at least two transistors, said voltage detecting means has an output terminal and comprises:
- a current difference detecting circuit, operatively connected between the first and second ends of the ringer sending resistor, for detecting the current difference extracted from the first end and the second end of said ringer sending resistor;
- an absolute calculation circuit, operatively connected to said current difference detecting circuit, for calculated an absolute current difference; and
- a voltage conversion circuit, operatively connected to said absolute calculation circuit, for converting the absolute current difference to a reconstructed voltage difference and outputting the same from the output terminal of said voltage detecting means; and state detecting means, operatively connected to said voltage detecting means, for detecting one of the on-hook state and the off-hook state of the subscriber telephone based upon the voltage difference, said state detecting means including comparator means formed by a plurality of transistors.

15. A ring trip circuit according to claim 14, wherein said current difference detecting circuit comprises:
- a current inversion circuit, operatively connected to the first end of the ringer sending resistor, for inverting a first current extracted from the first end of the ringer sending resistor for to produce an inverted first current, and
- an addition means, operatively connected to said current inversion circuit and the second end of the ringer sending resistor, for adding the inverted first current and a second current extracted from the second end of the ringer sending resistor.

16. A ringer trip circuit according to claim 15, wherein said current inversion circuit comprises:
- a first current switching circuit operatively connected to the first end of the ringer sending resistor and having first to third ports, said first current switching circuit supplies the first current from the second port to the third port when a first voltage at the first end is positive, or supplies the first current from the first port to the first end through the third-port when the first voltage at the first end is negative;
- a first current mirror circuit having a first terminal connected to the first port of said first current switching circuit and a second terminal; and
- a second current mirror circuit having a first terminal connected to the second port of said first current switching circuit and a second terminal connected to the second terminal of said first current mirror circuit; and wherein said addition means comprises a first line operatively connected to the second end of the ringer sending resistor, and a second line connected to said first line and connector to a common connected point of the second terminals of said first and second current mirror circuits.

17. A ring trip circuit according to claim 16, wherein said first current switching circuit comprises an npn-type transistor and a pnp-type transistor, a collector of said npn-type transistor being the first port, emitters of said transistors being commonly connected to the first end of the ringer sending resistor, a collector of said npn-type transistor being the second port, and bases of said transistors being supplied with a first source voltage, and wherein each of said first and second current mirror circuits comprises first and second transistors, a collector of said first transistor being the first terminal, a collector of said second transistor being the second terminal, and bases of said transistors being commonly connected.

18. A ring trip circuit according to claim 17, wherein each of said first and second current mirror circuits further comprises a third transistor having a base connected to the collector of said first transistor, an emitter connected to the bases of said first and second transistors, and a collector being supplied with the first source voltage.

19. A ring trip circuit according to claim 17, wherein each of said first and second current mirror circuits further comprises a first resistor connected to the emitter of said first transistor and a second resistor connected to said emitter of said second transistor.

20. A ring trip circuit according to claim 16, wherein said absolute calculation circuit comprises:
- a second current switching circuit connected to said addition means, and having first to third ports, said second current switching circuit supplies the current difference, as a difference current between the first current and the second current extracted from the second end of the ringer sending resistor, from the first port to the second port when the second voltage at the second end is positive, or supplies the current difference from the second port to the third port when the second voltage is negative, and
- a third current mirror circuit having a first terminal connected to the third port of said second current switching circuit and a second terminal connected to the first port of said second current switching circuit.

21. A ring trip circuit according to claim 20, wherein said second current switching circuit comprises an npn-type transistor and a pnp-type transistor, a collector of said pnp-type transistor being the first port, emitters of said transistors being commonly connected to said addition means, a collector of said npn-type transistor being the second port, bases of said transistors being supplied with the first voltage, and wherein said third current mirror circuit comprises first and second transistors, a collector of said first transistor being the first terminal, a collector of said second transistor being the second terminal, bases of said first and second transistors being commonly connected and connected to the collector of said first transistor, and emitters of said first and second transistors being supplied with a second source voltage.

22. A ring trip circuit according to claim 20, wherein said third current mirror circuit further comprises a third transistor, a base connected to the collector of said first transistor, an emitter connected to the bases of said first and second transistors, and a collector connected to the first source voltage.

23. A ring trip circuit according to claim 22, wherein said third current mirror circuit further comprises a first resistor connected to the emitter of said first transistor and a second resistor connected to the emitter of said second transistor.

24. A ring trip circuit according to claim 20, wherein said voltage conversion circuit comprises:
- a fourth current mirror circuit having a first terminal connected to the first port of said second current switching circuit, and a second terminal; and
- a voltage conversion resistor, connected to the second terminal of said fourth current mirror circuit, for converting the current difference produced therefrom into a reconstructed voltage difference.

25. A ring trip circuit according to claim 24, wherein said fourth current mirror circuit comprises first and second transistors, a collector of said first transistor being the first terminal, a collector of said second transistor being the second terminal, bases of said first and second transistors being commonly connected and operatively connected to the collector of said first transistor, and emitters of said transistors being supplied with a third source voltage.

26. A ring trip circuit according to claim 25, wherein said fourth current mirror circuit further comprises a first resistor connected to the emitter of said first transistor and a second resistor connected to the emitter of said second transistor.

27. A ring trip circuit according to claim 24, wherein said voltage conversion circuit further comprises a capacitor parallel connected to said voltage conversion resistor.

28. A ring trip circuit according to claim 1, further comprising scan output means, connected to said state detecting means, for outputting a digital detection signal in response to one of the on-hook state and the off-hook state.

29. A ring trip circuit for a subscriber telephone, the ring trip circuit operatively connected to a ringer sending resistor having first and second ends, the ringer sending resistor operatively connected between the subscriber telephone and a ringer source, said ring trip circuit comprising:
- voltage detecting means, operatively connected between the first and second ends of the ringer sending resistor, for detecting a voltage difference between the first and second ends of the ringer sending resistor and for converting the voltage difference to a current difference, the voltage difference varies in response to whether the subscriber telephone is in one of an on-hook state and an off-hook state, said voltage detecting means includes a plurality of current mirror circuits for the converting of the voltage difference to the current difference;
- voltage conversion means for receiving the current difference and for producing a converted voltage based on the current difference; and
- state detecting means, operatively connected to said voltage detecting means, for detecting one of the on-hook state and the off-hook state of the subscriber telephone based upon the voltage difference, said state detecting means including comparator means, said state detecting means receives the converted voltage and detects one of the on-hook state and the off-hook state by comparing the converted voltage with a predetermined threshold voltage level.

30. A ring trip circuit for a subscriber telephone, the ring trip circuit operatively connected to a ringer sending resistor having first and second ends, the ringer sending resistor operatively connected between the subscriber telephone and a ringer source, said ring trip circuit comprising:
- voltage detecting means, operatively connected between the first and second ends of the ringer sending resistor, for detecting a voltage difference between the first and second ends of the ringer sending resistor and for converting the voltage difference to a current difference, the voltage difference varies in dependence upon whether the subscriber telephone is in one of an on-hook state and an off-hook state;
- voltage conversion means, operatively connected to said voltage detecting means, for receiving the current difference and converting the current difference into a converted voltage; and
- state detecting means, operatively connected to said voltage conversion means, for receiving the converted voltage and detecting one of the on-hook state and the off-hook state by comparing the converted voltage with a predetermined threshold voltage level.

31. A ring trip circuit according to claim 29, wherein at least said voltage detecting means and said state detecting means of said ring trip circuit are formed on an integrated circuit.

* * * * *

UNITED STATES PATENT AND TRADEMARK OFFICE
CERTIFICATE OF CORRECTION

PATENT NO. : 4,995,111
DATED : February 19, 1991
INVENTOR(S) : Toshiro Tojo et al.

It is certified that error appears in the above-identified patent and that said Letters Patent is hereby corrected as shown below:

Title page, after the References Cited, insert the following:

FOREIGN PATENT DOCUMENTS

2 535 568    5/1984    France

Col. 8, line 47, change "R331" to --R324--.

Col. 9, line 53, change "f" to --F--.

Col. 10, line 17, change "f" to --F--.

Col. 12, line 8, change "second" (first occurrence) to --first--.

Col. 15, line 60, change "connector" to --connected--.

Signed and Sealed this

Eighth Day of December, 1992

Attest:

DOUGLAS B. COMER

*Attesting Officer*    *Acting Commissioner of Patents and Trademarks*